(12) United States Patent
Yang

(10) Patent No.: US 8,201,839 B2
(45) Date of Patent: Jun. 19, 2012

(54) BICYCLE WITH BIDIRECTIONAL INPUT AND ONE-WAY OUTPUT

(76) Inventor: Tai-Her Yang, Dzan-Hwa (TW)

( * ) Notice: Subject to any disclaimer, the term of this patent is extended or adjusted under 35 U.S.C. 154(b) by 58 days.

(21) Appl. No.: 12/699,138

(22) Filed: Feb. 3, 2010

(65) Prior Publication Data

US 2011/0190086 A1    Aug. 4, 2011

(51) Int. Cl.
*B62M 25/00* (2006.01)
(52) U.S. Cl. ........ 280/238; 280/210; 280/212; 280/214; 280/215; 280/221
(58) Field of Classification Search .................. 280/238, 280/210, 212, 214, 215, 221
See application file for complete search history.

(56) References Cited

U.S. PATENT DOCUMENTS

| | | | | |
|---|---|---|---|---|
| 5,667,233 A | * | 9/1997 | Metzinger | 280/238 |
| 7,815,542 B2 | * | 10/2010 | Dec | 475/326 |
| 8,047,956 B2 | * | 11/2011 | Frank | 475/297 |
| 2003/0034627 A1 | | 2/2003 | Kim et al. | |
| 2010/0011891 A1 | * | 1/2010 | Yang | 74/22 A |
| 2010/0013184 A1 | * | 1/2010 | Yang | 280/241 |
| 2010/0225085 A1 | * | 9/2010 | Kim | 280/221 |

FOREIGN PATENT DOCUMENTS

| | | |
|---|---|---|
| WO | WO 2004/101353 | 11/2004 |
| WO | WO 2006/033541 | 3/2006 |

OTHER PUBLICATIONS

European Search Report in corresponding European Application No. 11152779.2, dated May 24, 2011.

* cited by examiner

*Primary Examiner* — Joanne Silbermann
*Assistant Examiner* — Marlon Arce
(74) *Attorney, Agent, or Firm* — Bacon & Thomas, PLLC

(57) ABSTRACT

The present invention is applied to pedal vehicles, or mixture of electric and pedal vehicles, or combination of electric and pedal vehicles, especially to a bicycle capable of being pedaled bidirectionally and driven to move in unidirectional.

10 Claims, 5 Drawing Sheets

BICYCLE WITH BIDIRECTIONAL INPUT AND ONE-WAY OUTPUT

BACKGROUND OF THE INVENTION (a) Field of the Invention

For the bicycle with bidirectional input and one-way output of the present invention, human's foot drives the input terminal of the human input device at forward or reverse dual rotary direction, and then the output terminal of the human input device transmits the kinetic energy to the input terminal of the drive device with bidirectional input and one-way output, and the output terminal of the drive device with bidirectional input and one-way output produces constant rotary direction output to drive the load wheel set;

The present invention is applied to pedal vehicles, or mixture of electric and pedal vehicles, or combination of electric and pedal auxiliary vehicles, especially to a bicycle capable of being pedaled bidirectionally and driven to move in unidirectional.

(b) Description of the Prior Art

The rider on the conventional bicycle always pedals at constant direction, and the related muscles and joints are constantly used during the pedaling period, i.e. some muscles and joints of the rider's body are constantly used and stressed, and the others are constantly unused and released, overall, the human load is uneven, the rider is easily fatigued, and exercise injury is caused by frequently pedaling.

SUMMARY OF THE INVENTION

The bicycle with bidirectional input and one-way output of the present invention is a human input device with dual rotary direction, input, in which the output terminal thereof connects to the input terminal of a drive device with bidirectional input and one-way output, the constant rotary direction output through the output terminal of the drive device with bidirectional input and one-way output to drive a load wheel set; the rider chooses the direction of driving input, and makes constant rotary direction output with same or different speed ratio at different driven input direction to drive the load wheel set.

Figure 1:
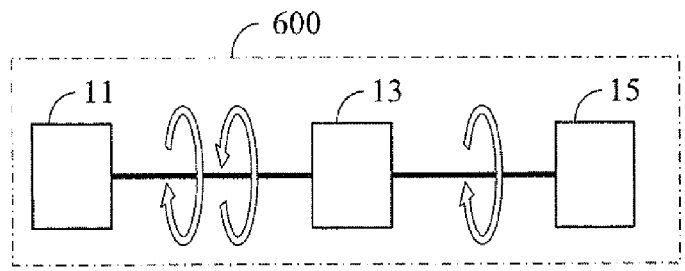
FIG. 1 is a schematic view showing the basic component blocks of the bicycle with bidirectional input and one-way output, according to the present invention.

DESCRIPTION OF MAIN COMPONENT SYMBOLS (11): Human input device
(12): Bugtriebwerk
(13): Drive device with bidirectional input and one-way output
(14): Rear transmission
(15): Load wheel set
(200): Planetary wheel support arm annular shelf
(201): Planetary wheel shaft
(202): Sun wheel
(203): Planetary wheel
(204): Outer wheel
(301), (302), (303), (305): One-way transmission
(400): Epicyclic gear support arm annular shelf
(401): Epicyclic gear shaft
(402): Inner bevel wheel
(403): Epicyclic gear
(404): Outer bevel wheel
(500): Shell of the transmission gear train
(600): Machine body
(602), (603), (605), (606), (615), (616), (617): Driving wheel
(604), (618): Revolving shaft
(607): Transmission belt
(2000): Input shaft
(3000): Output shaft

DETAILED DESCRIPTION OF THE PREFERRED EMBODIMENTS

The bicycle with bidirectional input and one-way output of the present invention drives the input terminal of the human input device at forward or reverse dual rotary direction through human's foot, and then the output terminal of the human input device transmits the kinetic energy to the input terminal of the drive device with bidirectional input and one-way output, and the output terminal of the drive device with bidirectional input and one-way output produces constant rotary direction output to drive the load wheel set, and further to drive the vehicle integrated at the load wheel set; the present invention is applied to pedal vehicles, or mixture of electric and pedal vehicles, or combination of electric and pedal auxiliary vehicles, especially to a bicycle capable of being pedaled bidirectionally and driven to move in unidirectional, for human's lower limbs pedaling at bi-direction to extend and change the muscle groups, thus achieving the following advantages:

(1) reducing the injured caused by some muscles and joints overused; and (2) employing or training the unused muscles and joints.

The present invention relates to a human input device with dual rotary direction input, in which the output terminal of the device is used to transmit the kinetic energy to the input terminal of the specific drive device with bidirectional input and one-way output, and the output terminal of the drive device with bidirectional input and one-way output produces constant rotary direction output to drive the load wheel set, and further to drive the vehicle integrated at the load wheel set; the rider selects the direction of pedal-driven input, and the drive device with bidirectional input and one-way output with same or different speed ratio produces constant rotary direction output at different driven input direction to drive the load wheel set.

FIG. 1 is a schematic view showing the basic component blocks of the bicycle with bidirectional input and one-way output, according to the present invention.

As shown in FIG. 1, which is a structural schematic view of the bicycle with bidirectional input and one-way output, except for the components of the pedal vehicle and a machine body (600), the main components include:

human input device (11): constituted by an output mechanism with dual rotary direction, which receives forward or reverse rotary driven input or reciprocating driven input from human's foot to produce forward or reverse rotation, including a pedal, a crank, and a driving wheel set with dual rotary direction, or a handle, a hand shank, and a driving wheel set with dual rotary direction, i.e. dual rotary direction mechanism by human power; in which the kinetic energy of the first driving rotary direction and the input kinetic energy of the second driving rotary direction are derived from human's foot for driving the input terminal of the human input device (11);

the first driving rotary direction and the second driving rotary direction are reverse;

drive device with bidirectional input and one-way output (13): which is driven by different rotary direction kinetic energy from the human input device (11), and outputs constant rotary direction kinetic energy; in which the transmission components within the drive device with bidirectional input and one-way output (13) are constituted by one or more of the followings, including (1) gear set; and/or (2) friction wheel set; and/or (3) chain and sprocket section; and/or (4) belt and pulley section; and/or (5) transmission crank and wheels set; and/or (6) fluid transmission unit; and/or (7) electromagnetic force actuator; and when the drive device with bidirectional input and one-way output (13) is driven through being input the first driving rotary direction and the second driving rotary direction, which are different rotary directions, the speed ratio between the input terminal and the output terminal with constant rotary direction is the same, different, or variable; in which the main transmission structure and operational features of the drive device with bidirectional input and one-way output (13) are as following:

the first rotary direction and the second rotary direction are reverse;

if the input terminal is driven by the first rotary direction, the first rotary direction output is produced through the first transmission gear train driving the output terminal;

if the input terminal is driven by the second rotary direction, the first rotary direction output is produced through the second transmission gear train driving the output terminal;

an one-way transmission is installed between the first transmission gear train and the second transmission gear train to avoid the interference from the second transmission gear train when the first transmission gear train is used to be the first rotary direction input and produces the first rotary direction output;

an one-way transmission is installed between the second transmission gear train and the first transmission gear train to avoid the interference from the first transmission gear train when the second transmission gear train is used to be the second rotary direction input and produces the first rotary direction output;

load wheel set (15): directly driven by the output terminal of the drive device with bidirectional input and one-way output (13), and further driving a vehicle integrated with the load wheel set (15); in which for the bicycle with bidirectional input and one-way output of the present invention, if it is driven through the human input device (11) by human's foot at the first driving rotary direction, or at the second rotary direction with different rotary direction from the first driving rotary direction, the rotary kinetic energy output from the output terminal of the human input device (11) is transmitted to the input terminal of the drive device with bidirectional input and one-way output (13) via the additionally installed bugtriebwerk (12), and the output terminal of the drive device with bidirectional input and one-way output (13) outputs rotary kinetic energy with constant rotary direction, to drive the load wheel set (15), and to further drive a vehicle integrated with the load wheel set (15).

Figure 2:
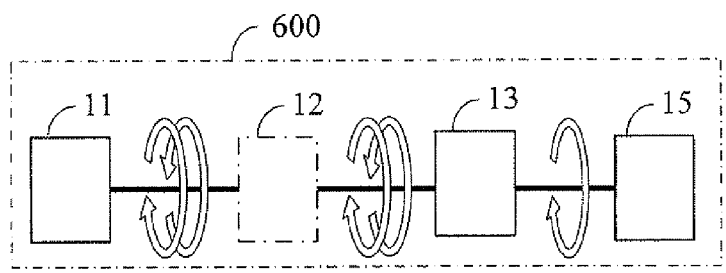
FIG. 2 is a schematic view showing the driving device component blocks, in which a bugtriebwerk (12) is additionally installed between a human input device (11) and a drive device with bidirectional input and one-way output (13) in FIG. 1.

FIG. 2 is a schematic view showing the driving device component blocks, in which a bugtriebwerk (12) is additionally installed between a human input device (11) and a drive device with bidirectional input and one-way output (13) in FIG. 1.

As shown in FIG. 2, which is a structural schematic view of the bicycle with bidirectional input and one-way output, except for the components of the pedal vehicle and the machine body (600), the main components include:

human input device (11): constituted by an output mechanism with dual rotary direction, which receives forward or reverse rotary driven input or reciprocating driven input from human's foot to produce forward or reverse rotation, including a pedal, a crank, and a driving wheel set with dual rotary direction, or a handle, a hand shank, and a driving wheel set with dual rotary direction, i.e. dual rotary direction mechanism by human power; in which the kinetic energy of the first driving rotary direction and the input kinetic energy of the second driving rotary direction are derived from human's foot for driving the input terminal of the human input device (11);

the first driving rotary direction and the second driving rotary direction are reverse;

bugtriebwerk (12): constituted by one or more of the following transmissions including various rotary transmission functional structures, such as gear type, belt type, or friction-type, with constant speed ratio or variable speed ratio; in which the bugtriebwerk (12) is driven by the human input device (11) and outputs rotary kinetic energy for driving the drive device with bidirectional input and one-way output (13);

drive device with bidirectional input and one-way output (13): which is driven by different rotary direction kinetic energy from the bugtriebwerk (12), and outputs constant rotary direction kinetic energy; in which the transmission components within the drive device with bidirectional input and one-way output (13) are constituted by one or more of the followings, including (1) gear set; and/or (2) friction wheel set; and/or (3) chain and sprocket section; and/or (4) belt and pulley section; and/or (5) transmission crank and wheels set; and/or (6) fluid transmission unit; and/or (7) electromagnetic force actuator; and when the drive device with bidirectional input and one-way output (13) is driven through being input the first driving rotary direction and the second driving rotary direction, which are different rotary directions, the speed ratio between the input terminal and the output terminal with constant rotary direction is the same, different, or variable; in which the main transmission structure and operational features of the drive device with bidirectional input and one-way output (13) are as following:

the first rotary direction and the second rotary direction are reverse;

if the input terminal is driven by the first rotary direction, the first rotary direction output is produced through the first transmission gear train driving the output terminal;

if the input terminal is driven by the second rotary direction, the first rotary direction output is produced through the second transmission gear train driving the output terminal;

an one-way transmission is installed between the first transmission gear train and the second transmission gear train to avoid the interference from the second transmission gear train when the first transmission gear train is used to be the first rotary direction input and produces the first rotary direction output;

an one-way transmission is installed between the second transmission gear train and the first transmission gear train to avoid the interference from the first transmission gear train when the second transmission gear train is used to be the second rotary direction input and produces the first rotary direction output;

load wheel set (15): directly driven by the output terminal of the drive device with bidirectional input and one-way output (13), and further driving a vehicle integrated with the load wheel set (15); in which for the bicycle with bidirectional input and one-way output, if it is driven through the human input device (11) by human's foot, the rotary kinetic energy output from the output terminal of the human input device (11) is transmitted to the drive device with bidirectional input and one-way output (13), and the output terminal of the drive device with bidirectional input and one-way output (13) outputs rotary kinetic energy with constant rotary direction, for the additionally installed rear transmission (14) to drive the load wheel set (15), and to further drive a vehicle integrated with the load wheel set (15).

Figure 3:
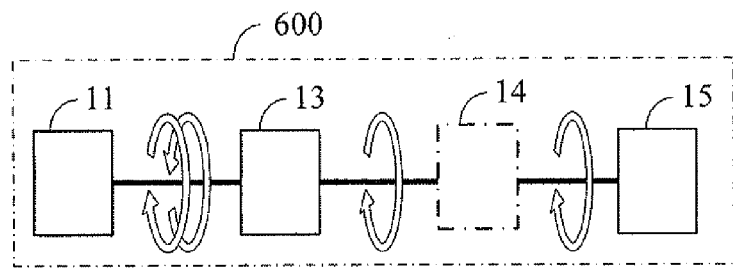
FIG. 3 is a schematic view showing the driving device component blocks, in which a rear transmission (14) is additionally installed between the drive device with bidirectional input and one-way output (13) and a load wheel set (15) in FIG. 1.

FIG. 3 is a schematic view showing the driving device component blocks, in which a rear transmission (14) is additionally installed between the drive device with bidirectional input and one-way output (13) and a load wheel set (15) in FIG. 1.

As shown in FIG. 3, which is a structural schematic view of the bicycle with bidirectional input and one-way output, except for the components of the pedal vehicle and the machine body (600), the main components include:

human input device (11): constituted by an output mechanism with dual rotary direction, which receives forward or reverse rotary driven input or reciprocating driven input from human's foot to produce forward or reverse rotation, including a pedal, a crank, and a driving wheel set with dual rotary direction, or a handle, a hand shank, and a driving wheel set with dual rotary direction, i.e. dual rotary direction mechanism by human power; in which the kinetic energy of the first driving rotary direction and the input kinetic energy of the second driving rotary direction are derived from human's foot for driving the input terminal of the human input device (11);

the first driving rotary direction and the second driving rotary direction are reverse;

drive device with bidirectional input and one-way output (13): which is driven by different rotary direction kinetic energy from the human input device (11) through the bugtriebwerk (12), and outputs constant rotary direction kinetic energy; in which the transmission components within the drive device with bidirectional input and one-way output (13) are constituted by one or more of the followings, including (1) gear set; and/or (2) friction wheel set; and/or (3) chain and sprocket section; and/or (4) belt and pulley section; and/or (5) transmission crank and wheels set; and/or (6) fluid transmission unit; and/or (7) electromagnetic force actuator; and when the drive device with bidirectional input and one-way output (13) is driven through being input the first driving rotary direction and the second driving rotary direction, which are different rotary directions, the speed ratio between the input terminal and the output terminal with constant rotary direction is the same, different, or variable; in which the main transmission structure and operational features of the drive device with bidirectional input and one-way output (13) are as following:

the first rotary direction and the second rotary direction are reverse;

if the input terminal is driven by the first rotary direction, the first rotary direction output is produced through the first transmission gear train driving the output terminal;

if the input terminal is driven by the second rotary direction, the first rotary direction output is produced through the second transmission gear train driving the output terminal;

an one-way transmission is installed between the first transmission gear train and the second transmission gear train to avoid the interference from the second transmission gear train when the first transmission gear train is used to be the first rotary direction input and produces the first rotary direction output;

an one-way transmission is installed between the second transmission gear train and the first transmission gear train to avoid the interference from the first transmission gear train when the second transmission gear train is used to be the second rotary direction input and produces the first rotary direction output;

rear transmission (14): constituted by one or more of the following transmissions including various rotary transmission functional structures, such as gear type, belt type, or friction-type, with constant speed ratio or variable speed ratio, for being driven by the drive device with bidirectional input and one-way output (13), whereas its output terminal is used to drive the load wheel set (15); and load wheel set (15): directly driven by the output terminal of the rear transmission (14), and further driving a vehicle integrated with the load wheel set (15); in which for the bicycle with bidirectional input and one-way output of the present invention, if it is driven through the human input device (11) by human's foot, the output terminal outputs rotary kinetic energy transmitted to the input terminal of the drive device with bidirectional input and one-way output (13) through the additionally installed bugtriebwerk (12), and the output terminal of the drive device with bidirectional input and one-way output (13) outputs constant rotary direction output, and then through the additionally installed rear transmission (14) to drive the load wheel set (15), and to further drive a vehicle integrated with the load wheel set (15).

Figure 4:
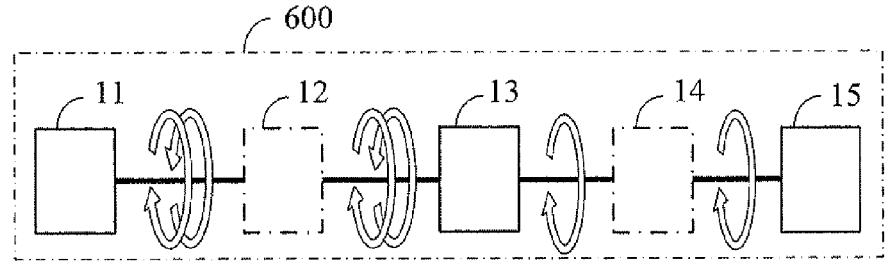
FIG. 4 is a schematic view showing the driving device component blocks, in which the bugtriebwerk (12) is additionally installed between the human input device (11) and the drive device with bidirectional input and one-way output (13), and the rear transmission (14) is additionally installed between the drive device with bidirectional input and one-way output (13) and the load wheel set (15) in FIG. 1.

FIG. 4 is a schematic view showing the driving device component blocks, in which the bugtriebwerk (12) is additionally installed between the human input device (11) and the drive device with bidirectional input and one-way output (13), and the rear transmission (14) is additionally installed between the drive device with bidirectional input and one-way output (13) and the load wheel set (15) in FIG. 1.

As shown in FIG. 4, which is a structural schematic view of the bicycle with bidirectional input and one-way output, except for the components of the pedal vehicle and the machine body (600), the main components include:

human input device (11): constituted by an output mechanism with dual rotary direction, which receives forward or reverse rotary driven input or reciprocating driven input from human's foot to produce forward or reverse rotation, including a pedal, a crank, and a driving wheel set with dual rotary direction, or a handle, a hand shank, and a driving wheel set with dual rotary direction, i.e. dual rotary direction mechanism by human power; in which the kinetic energy of the first driving rotary direction and the input kinetic energy of the second driving rotary direction are derived from human's foot for driving the input terminal of the human input device (11);

the first driving rotary direction and the second driving rotary direction are reverse;

bugtriebwerk (12): constituted by one or more of the following transmissions including various rotary transmission functional structures, such as gear type, belt type, or friction-type, with constant speed ratio or variable speed ratio; in which the bugtriebwerk (12) is driven by the human input device (11) and outputs rotary kinetic energy for driving the drive device with bidirectional input and one-way output (13);

drive device with bidirectional input and one-way output (13): which is driven by different rotary direction kinetic energy from the bugtriebwerk (12), and outputs constant rotary direction kinetic energy; in which the transmission components within the drive device with bidirectional input and one-way output (13) are constituted by one or more of the followings, including (1) gear set; and/or (2) friction wheel set; and/or (3) chain and sprocket section; and/or (4) belt and pulley section; and/or (5) transmission crank and wheels set; and/or (6) fluid transmission unit; and/or (7) electromagnetic force actuator; and when the drive device with bidirectional input and one-way output (13) is driven through being input the first driving rotary direction and the second driving rotary direction, which are different rotary directions, the speed ratio between the input terminal and the output terminal with constant rotary direction is the same, different, or variable; in which the main transmission structure and operational features of the drive device with bidirectional input and one-way output (13) are as following:

the first rotary direction and the second rotary direction are reverse;

if the input terminal is driven by the first rotary direction, the first rotary direction output is produced through the first transmission gear train driving the output terminal;

if the input terminal is driven by the second rotary direction, the first rotary direction output is produced through the second transmission gear train driving the output terminal;

an one-way transmission is installed between the first transmission gear train and the second transmission gear train to avoid the interference from the second transmission gear train when the first transmission gear train is used to be the first rotary direction input and produces the first rotary direction output;

an one-way transmission is installed between the second transmission gear train and the first transmission gear train to avoid the interference from the first transmission gear train when the second transmission gear train is used to be the second rotary direction input and produces the first rotary direction output;

rear transmission (14): constituted by one or more of the following transmissions including various rotary transmission functional structures, such as gear type, belt type, or friction-type, with constant speed ratio or variable speed ratio, for being driven by the drive device with bidirectional input and one-way output (13), whereas its output terminal is used to drive the load wheel set (15); and load wheel set (15): directly driven by the output terminal of the rear transmission (14), and further driving a vehicle integrated with the load wheel set (15).

For the bicycle with bidirectional input and one-way output of the present invention, except for the related components, machine body and the load wheel set of the driven vehicle installed, it is also characterized in the function of the bidirectional input and one-way output, and the components and operational features of the drive device with bidirectional input and one-way output (13) are provided for describing the feasibility.

Figure 5:
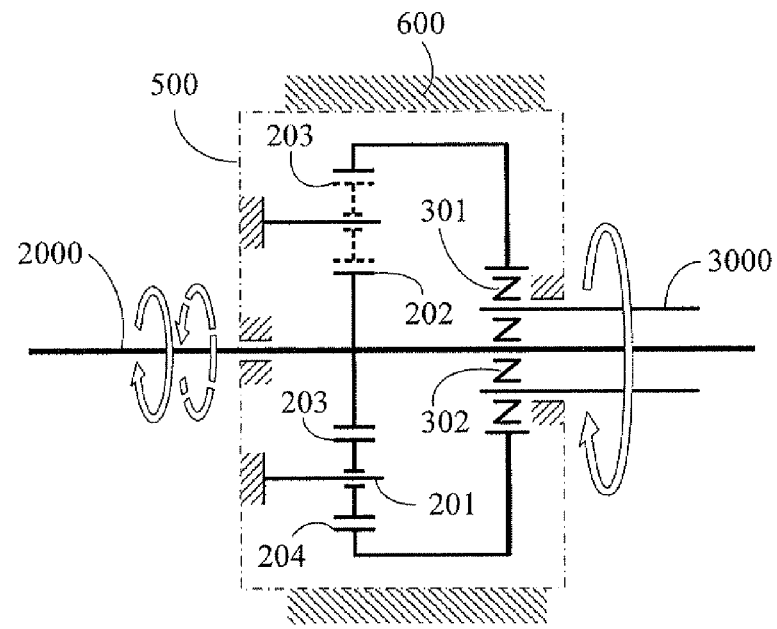
FIG. 5 is a schematic structural view showing the first embodiment of the drive device with bidirectional input and one-way output (13)
Figure 6:
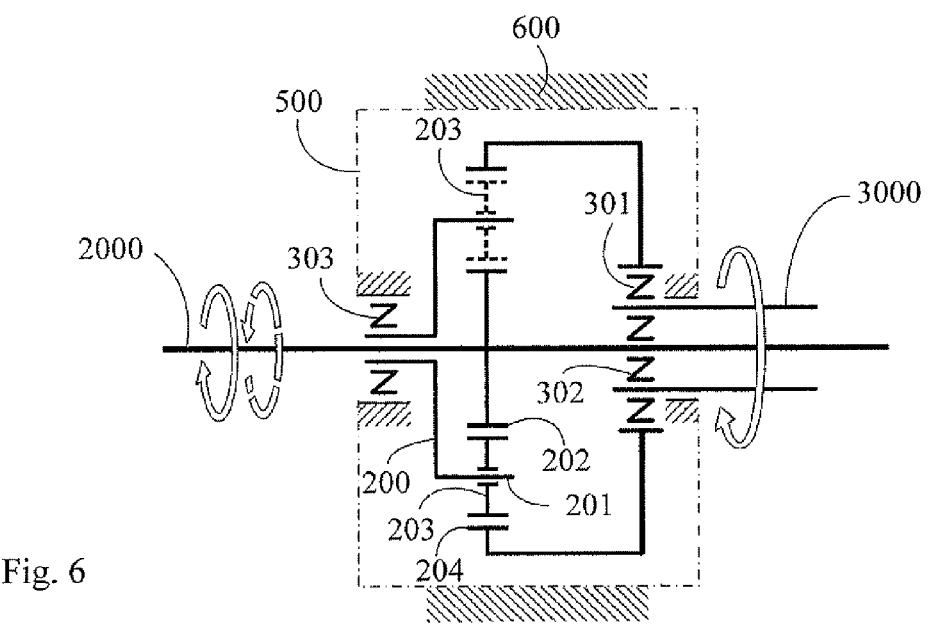
FIG. 6 is a schematic structural view showing the second embodiment of the drive device with bidirectional input and one-way output (13)
Figure 7:
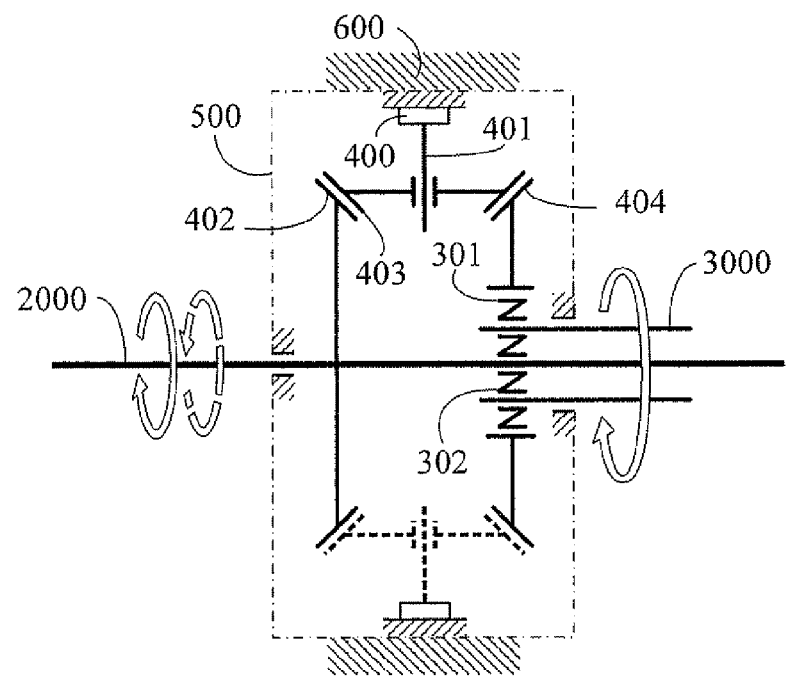
FIG. 7 is a schematic structural view showing the third embodiment of the drive device with bidirectional input and one-way output (13)
Figure 8:
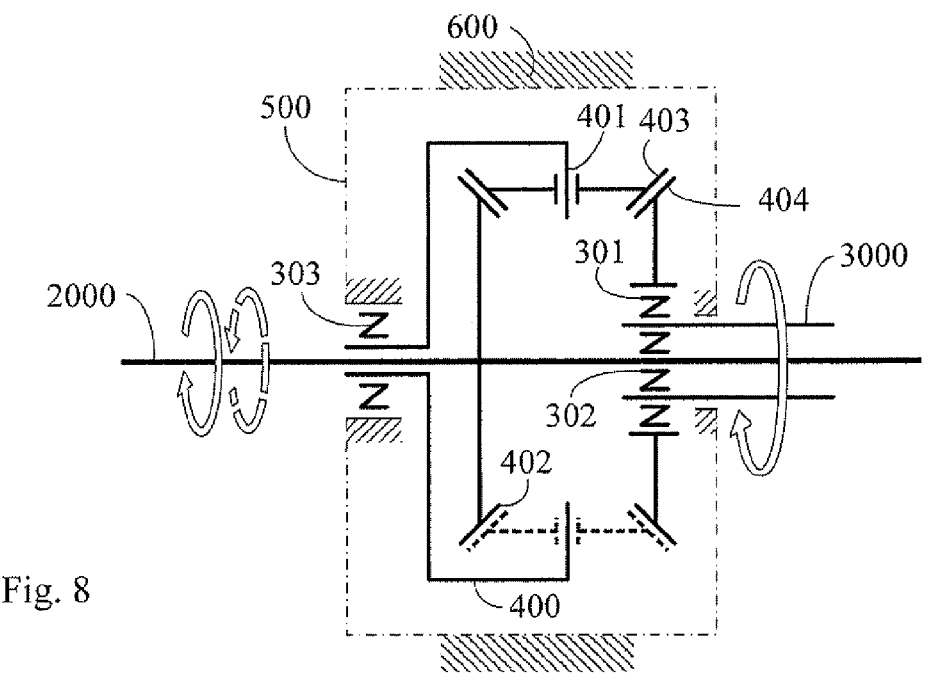
FIG. 8 is a schematic structural view showing the 4th embodiment of the drive device with bidirectional input and one-way output (13)

The installed drive device with bidirectional input and one-way output (13) in the bicycle with bidirectional input and one-way output of the present invention, whose operational features are as following:

the first rotary direction and the second rotary direction are reverse;

if the input terminal is driven by the first rotary direction, the first rotary direction output is produced through the first transmission gear train driving the output terminal;

if the input terminal is driven by the second rotary direction, the first rotary direction output is produced through the second transmission gear train driving the output terminal;

an one-way transmission is installed between the first transmission gear train and the second transmission gear train to avoid the interference from the second transmission gear train when the first transmission gear train is used to be the first rotary direction input and produces the first rotary direction output;

an one-way transmission is installed between the second transmission gear train and the first transmission gear train to avoid the interference from the first transmission gear train when the second transmission gear train is used to be the second rotary direction input and produces the first rotary direction output;

In the bicycle with bidirectional input and one-way output of the present invention, the embodiments of the drive device with bidirectional input and one-way output (13) used are shown as FIGS. 5 to 12, including:

A) as shown in FIGS. 5 to 6, which is constituted by a planetary gear train;

B) as shown in FIGS. 7 to 8, which is constituted by an epicyclic gear train; and C) as shown in FIGS. 9 to 12, which is integrated constituted by a transmission with different transmission rotary direction.

FIG. 5 is a schematic structural view showing the first embodiment of the drive device with bidirectional input and one-way output (13).

As shown in FIG. 5, the bicycle with bidirectional input and one-way output of the present invention is constituted by the planetary gear train with the input shaft and the output shaft coaxial fitting, the main components including:

- one end of the input shaft (2000) is through installed at one side of the shell of the transmission gear train (500) via a bearing structure, while the other end of the input shaft (2000) perforates through the output shaft (3000) via the one-way transmission (302), and a bearing is installed between the output shaft (3000) and the shell of the transmission gear train (500);
- shell of the transmission gear train (500): machine parts installed for constituting the wheel system with bidirectional input and one-way output;
- machine body (600): a relatively static mechanism structure;
- the input shaft (2000) is integrated with the sun wheel (202);
- the planetary wheel (203) is installed between the outer wheel (204) and the sun wheel (202); the center of the planetary wheel (203) rotates at the planetary wheel shaft (201), and one end of the planetary wheel shaft (201) is fixed at the shell of the transmission gear train (500);
- the shell of the transmission gear train (500) is fixed installed at the machine body (600);
- an one-way transmission (301) is installed between the ring structure of the outer wheel (204) and the output shaft (3000);
- the sun wheel (202), the planetary wheel (203), and the outer wheel (204) are constituted by gears or friction wheels;
- the relation of the transmission ratio of using the sun wheel (202) to drive the planetary wheel (203) includes acceleration, deceleration, or constant velocity;
- the relation of the transmission ratio of using the planetary wheel (203) to drive the outer wheel (204) includes acceleration, deceleration, or constant velocity;
- by way of the above structures, the input shaft (2000) is driven at the first rotary direction, and it is through the one-way transmission (302) for driving the output shaft (3000) to produce the first rotary direction output, therefore to constitute the first transmission gear train;
- by way of the above structures, the input shaft (2000) is driven at the second rotary direction, and it is through the sun wheel (202) for further driving the planetary wheel (203) and the outer wheel (204), and through the ring structure of the outer wheel (204) and the one-way transmission (301) for driving the output shaft (3000) to produce the first rotary direction output, therefore to constitute the second transmission gear train.

FIG. 6 is a schematic structural view showing the second embodiment of the drive device with bidirectional input and one-way output (13).

As shown in FIG. 6, the bicycle with bidirectional input and one-way output of the present invention is constituted by the planetary gear train with the input shaft and the output shaft coaxial fitting, the main components including:

- one end of the input shaft (2000) is through installed at one side of the shell of the transmission gear train (500) via a rotational structure of the planetary wheel support arm annular shelf (200) and the one-way transmission (303), while the other end of the input shaft (2000) perforates through the output shaft (3000) via the one-way transmission (302), and a bearing is installed between the output shaft (3000) and the shell of the transmission gear train (500);
- shell of the transmission gear train (500): machine parts installed for constituting the wheel system with bidirectional input and one-way output;
- machine body (600): a relatively static mechanism structure;
- the input shaft (2000) is integrated with the sun wheel (202);
- the planetary wheel (203) is installed between the outer wheel (204) and the sun wheel (202); the center of the planetary wheel (203) rotates at the planetary wheel shaft (201), one end of the planetary wheel shaft (201) is integrated with the planetary wheel support arm annular shelf (200), and the planetary wheel support arm annular shelf (200) rotates between the input shaft (2000) and the one-way transmission (303);
- the shell of the transmission gear train (500) is fixed installed at the machine body (600);
- an one-way transmission (301) is installed between the ring structure of the outer wheel (204) and the output shaft (3000);
- the sun wheel (202), the planetary wheel (203), and the outer wheel (204) are constituted by gears or friction wheels;
- the relation of the transmission ratio of using the sun wheel (202) to drive includes acceleration, deceleration, or constant velocity;
- the relation of the transmission ratio of using the planetary wheel (203) to drive the outer wheel (204) includes acceleration, deceleration, or constant velocity;
- by way of the above structures, the input shaft (2000) is driven at the first rotary direction, and it is through the one-way transmission (302) for driving the output shaft (3000) to produce the first rotary direction output, therefore to constitute the first transmission gear train;
- by way of the above structures, the input shaft (2000) is driven at the second rotary direction, and it is through the sun wheel (202) for further driving the planetary wheel (203) and the outer wheel (204), and through the ring structure of the outer wheel (204) and the one-way transmission (301) for driving the output shaft (3000) to produce the first rotary direction output, therefore to constitute the second transmission gear train.

FIG. 7 is a schematic structural view showing the third embodiment of the drive device with bidirectional input and one-way output (13).

As shown in FIG. 7, the bicycle with bidirectional input and one-way output of the present invention is constituted by the epicyclic gear train with the input shaft and the output shaft coaxial fitting, the main components including:

- one end of the input shaft (2000) is through installed at one side of the shell of the transmission gear train (500) via a bearing structure, while the other end of the input shaft (2000) perforates through the output shaft (3000) via the one-way transmission (302), and a bearing is installed between the output shaft (3000) and the shell of the transmission gear train (500);

shell of the transmission gear train (500): machine parts installed for constituting the wheel system with bidirectional input and one-way output;

machine body (600): a relatively static mechanism structure;

the input shaft (2000) is integrated with the inner bevel wheel (402);

the epicyclic gear (403) is installed between the outer bevel wheel (404) and the inner bevel wheel (402); the center of the epicyclic gear (403) rotates at the epicyclic gear shaft (401), one end of the epicyclic gear shaft (401) is integrated with the epicyclic gear support arm annular shelf (400), and the epicyclic gear support arm annular shelf (400) is fixed at the shell of the transmission gear train (500);

the shell of the transmission gear train (500) is fixed installed at the machine body (600);

the one-way transmission (301) is installed between the outer bevel wheel (404) and the output shaft (3000);

the inner bevel wheel (402), the epicyclic gear (403), and the outer bevel wheel (404) are constituted by gears or friction wheels;

the relation of the transmission ratio of using the inner bevel wheel (402) to drive the epicyclic gear (403) includes acceleration, deceleration, or constant velocity;

the relation of the transmission ratio of using the epicyclic gear (403) to drive the outer bevel wheel (404) includes acceleration, deceleration, or constant velocity;

by way of the above structures, the input shaft (2000) is driven at the first rotary direction, and it is through the one-way transmission (302) for driving the output shaft (3000) to produce the first rotary direction output, therefore to constitute the first transmission gear train;

by way of the above structures, the input shaft (2000) is driven at the second rotary direction, and it is through the inner bevel wheel (402), for further driving the epicyclic gear (403) and the outer bevel wheel (404), and through the outer bevel wheel (404) and the one-way transmission (301) for driving the output shaft (3000) to produce the first rotary direction output, therefore to constitute the second transmission gear train.

FIG. 8 is a schematic structural view showing the 4th embodiment of the drive device with bidirectional input and one-way output (13).

As shown in FIG. 8, the bicycle with bidirectional input and one-way output of the present invention is constituted by the epicyclic gear train with the input shaft and the output shaft coaxial fitting, the main components including:

one end of the input shaft (2000) is through installed at the epicyclic gear support arm annular shelf (400) via a bearing structure, the epicyclic gear support arm annular shelf (400) is integrated with one side of the shell of the transmission gear train (500) via the one-way transmission (303), while the other r end of the input shaft (2000) perforates through the output shaft (3000) via the one-way transmission (302), and a bearing is installed between the output shaft (3000) and the shell of the transmission gear train (500);

shell of the transmission gear train (500): machine parts installed for constituting the wheel system with bidirectional input and one-way output;

machine body (600): a relatively static mechanism structure;

the input shaft (2000) is integrated with the inner bevel wheel (402);

the epicyclic gear (403) is installed between the outer bevel wheel (404) and the inner bevel wheel (402); the center of the epicyclic gear (403) rotates at the epicyclic gear shaft (401), the epicyclic gear shaft (401) is integrated with the epicyclic gear support arm annular shelf (400), and the epicyclic gear support arm annular shelf (400) rotates, between the input shaft (2000) and the one-way transmission (303);

the shell of the transmission gear train (500) is fixed installed at the machine body (600);

the outer bevel wheel (404) is surrounded installed to the output shaft (3000) via the one-way transmission (301);

the inner bevel wheel (402), the epicyclic gear (403), and the outer bevel wheel (404) are constituted by gears or friction wheels;

the relation of the transmission ratio of using the inner bevel wheel (402) to drive the epicyclic gear (403) includes acceleration, deceleration, or constant velocity;

the relation of the transmission ratio of using the epicyclic gear (403) to drive the outer bevel wheel (404) includes acceleration, deceleration, or constant velocity;

by way of the above structures, the input shaft (2000) is driven at the first rotary direction, and it is through the one-way transmission (302) for driving the output shaft (3000) to produce the first rotary direction output, therefore to constitute the first transmission gear train;

by way of the above structures, the input shaft (2000) is driven at the second rotary direction, and it is through the inner bevel wheel (402), the epicyclic gear (403), and the outer bevel wheel (404), and then through the one-way transmission (301) for driving the output shaft (3000) to produce the first rotary direction output, therefore to constitute the second transmission gear train.

Figure 9:
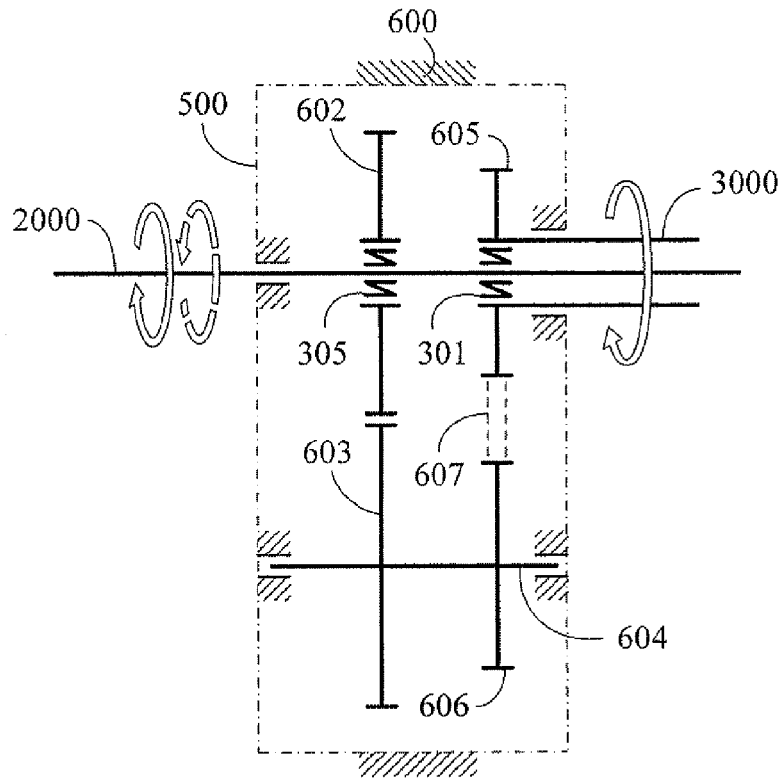
FIG. 9 is a schematic structural view showing the 5th embodiment of the drive device with bidirectional input and one-way output (13)

FIG. 9 is a schematic structural view showing the 5th embodiment of the drive device with bidirectional input and one-way output (13).

As shown in FIG. 9, the bicycle with bidirectional input and one-way output of the present invention is constituted by integrating with the transmissions with different drive rotating directions with the input shaft and the output shaft coaxial fitting, the main components including:

one end of the input shaft (2000) is through installed at one side of the shell of the transmission gear train (500) via a bearing structure, while the other end of the input shaft (2000) perforates through the output shaft (3000) via the one-way transmission (301), a bearing is installed between the output shaft (3000) and the shell of the transmission gear train (500);

shell of the transmission gear train (500): machine parts installed for constituting the wheel system with bidirectional input and one-way output;

machine body (600): a relatively static mechanism structure;

the input shaft (2000) is perforating through the one-way transmission (305), and then integrated with the driving wheel (602);

the rotary direction of driving wheel (602) is different from that of driving wheel (603), the driving wheel (603) and the driving wheel (606) are co-integrated with the revolving shaft (604), and a bearing is installed between the revolving shaft (604) and the shell of the transmission gear train (500);

the driving wheel (606) and the driving wheel (605) is constituted by the pulley or the sprocket, which are transmitted by the transmission belt (607) to constitute a driving wheel set with the same rotary direction;

the driving wheel (605) is integrated with the output shaft (3000);

the shell of the transmission gear train (500) is fixed installed at the machine body (600);

the driving wheels (602) and (603) are constituted by gears or friction wheels;

the relation of the transmission ratio in the driving wheel set with different rotary directions includes acceleration, deceleration, or constant velocity;

the relation of the transmission ratio in the driving wheel set with the same rotary direction includes acceleration, deceleration, or constant velocity;

the driving wheel set with the same rotary direction are constituted by the transmission belts, pulleys (such as toothed belt or steel belt), or sprockets with chains;

by way of the above structures, the input shaft (2000) is driven at the first rotary direction, and it is through the one-way transmission (301) for driving the output shaft (3000) to produce the first rotary direction output, therefore to constitute the first transmission gear train;

by way of the above structures, the input shaft (2000) is driven at the second rotary direction, and it is through the one-way transmission (305) driving the driving wheel (602), and then through the driving wheel (602) driving the driving wheel (603) and the driving wheel (606), and further through the driving wheel (606) driving the driving wheel (605) for driving the output shaft (3000) to produce the first rotary direction output to constitute the second transmission gear train.

Figure 10:
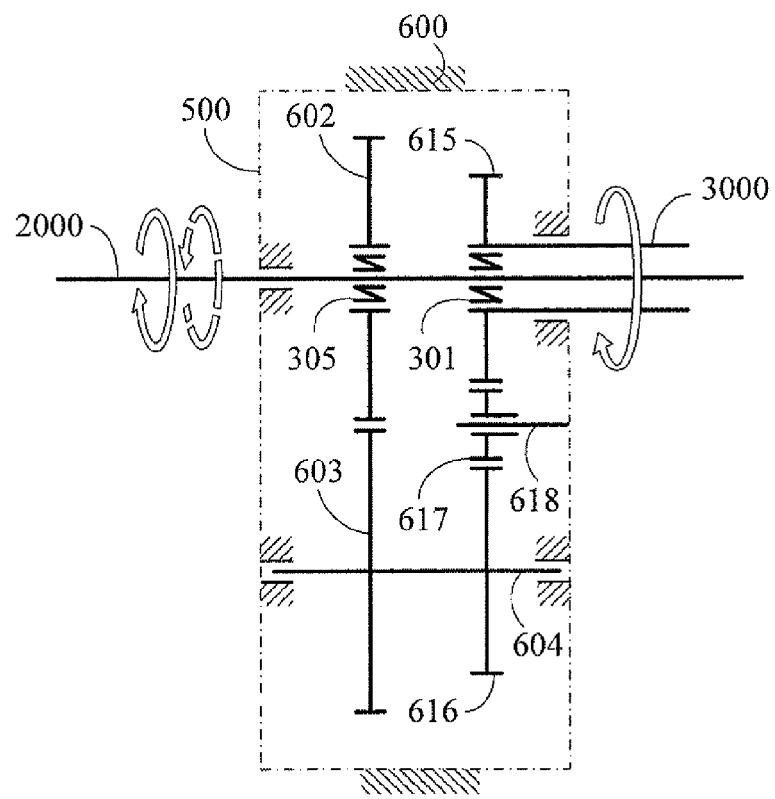
FIG. 10 is a schematic structural view showing the 6th embodiment of the drive device with bidirectional input and one-way output (13)

FIG. 10 is a schematic structural view showing the 6th embodiment of the drive device with bidirectional input and one-way output (13).

As shown in FIG. 10, the bicycle with bidirectional input and one-way output of the present invention is constituted by integrating with the transmissions with different drive rotating directions with the input shaft and the output shaft coaxial fitting, the main components including:

one end of the input shaft (2000) is through installed at one side of the shell of the transmission gear train (500) via a bearing structure, while the other end of the input shaft (2000) perforates through the output shaft (3000) via the one-way transmission (301), a bearing is installed between the output shaft (3000) and the shell of the transmission gear train (500);

shell of the transmission gear train (500): machine parts installed for constituting the wheel system with bidirectional input and one-way output;

machine body (600): a relatively static mechanism structure;

the input shaft (2000) is perforating through the one-way transmission (305), and then integrated with the driving wheel (602);

the driving wheel (602) and the driving wheel (603) are in different rotary directions, the driving wheel (603) and the driving wheel (616) are co-integrated with the revolving shaft (604), and a bearing is installed between the revolving shaft (604) and the shell of the transmission gear train (500);

the driving wheel (616) is through the driving wheel (617) rotating at the revolving shaft (618) to drive the driving wheel (615) for constituting a driving wheel set with the same rotary direction;

the revolving shaft (618) is integrated with the shell of the transmission gear train (500);

the driving wheel (615) is integrated with the output shaft (3000);

the shell of the transmission gear train (500) is fixed installed at the machine body (600);

the driving wheels (602), (603), (615), (616), and (617) are constituted by gears or friction wheels;

the relation of the transmission ratio in the driving wheel set with different rotary directions includes acceleration, deceleration, or constant velocity;

the relation of the transmission ratio in the driving wheel set with the same rotary direction includes acceleration, deceleration, or constant velocity;

the driving wheel set with the same rotary direction are constituted by the gear set including an idler wheel or by the internal gear set;

by way of the above structures, the input shaft (2000) is driven at the first rotary direction, and it is through the one-way transmission (301) for driving the output shaft (3000) to produce the first rotary direction output, therefore to constitute the first transmission gear train;

by way of the above structures, the input shaft (2000) is driven at the second rotary direction, and it is through the one-way transmission (305) driving the driving wheel (602), and through the driving wheel (602) driving the driving wheel (603) and the driving wheel (616), and then through the driving wheel (616) via the driving wheel (617) for further driving the driving wheel (615), and then the driving wheel (615) driving the output shaft (3000) to produce the first rotary direction output, therefore to constitute the second transmission gear train.

Figure 11:
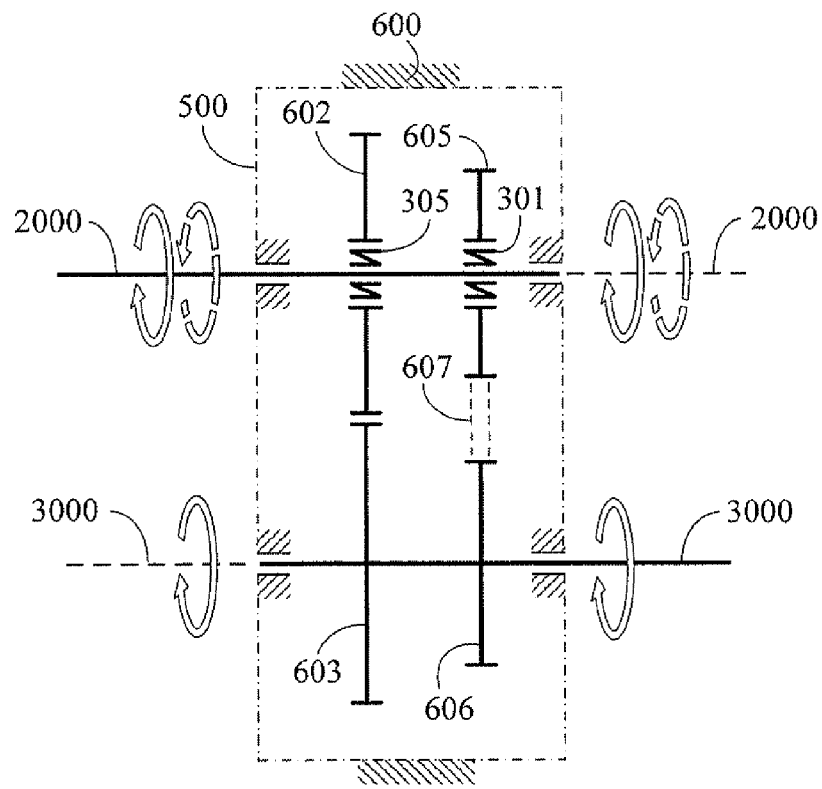
FIG. 11 is a schematic structural view showing the 7th embodiment of the drive device with bidirectional input and one-way output (13)

FIG. 11 is a schematic structural view showing the 7th embodiment of the drive device with bidirectional input and one-way output (13).

As shown in FIG. 11, the bicycle with bidirectional input and one-way output of the present invention is constituted by integrating with the transmissions with different drive rotating directions, in which the input shaft and the output shaft have different axes, the main components including:

one end of the input shaft (2000) is through installed at one side of the shell of the transmission gear train (500) via a bearing structure, while the other end of the input shaft (2000) perforates through the driving wheel (605) via the one-way transmission (301), a bearing is installed between the another end of the input shaft (2000) and the shell of the transmission gear train (500), and the rotary power source is inputted through one or two ends of the input shaft (2000);

shell of the transmission gear train (500): machine parts installed for constituting the wheel system with bidirectional input and one-way output;

machine body (600): a relatively static mechanism structure;

the input shaft (2000) is perforating through the one-way transmission (305), and then integrated with the driving wheel (602);

the driving wheel (602) and the driving wheel (603) are in different rotary directions, the driving wheel (603) is integrated with the output shaft (3000), the driving wheel (606) is integrated with the output shaft (3000), and a bearing is installed between the output shaft (3000) and the shell of the transmission gear train (500);

the driving wheel (605) and the driving wheel (606) are constituted by the pulley or the sprocket, which are transmitted by the transmission belt (607), to constituted a driving wheel set with the same rotary direction;

the driving wheel (606) is integrated with the output shaft (3000); the shell of the transmission gear train (500) is fixed installed at the machine body (600);

the driving wheels (602) and (603) are constituted by gears or friction wheels;

the relation of the transmission ratio in the driving wheel set with different rotary directions includes acceleration, deceleration, or constant velocity;

the relation of the transmission ratio in the driving wheel set with the same rotary direction includes acceleration, deceleration, or constant velocity;

the driving wheel set with the same rotary direction is constituted by transmission belts, pulleys (such as toothed belt or steel belt), or sprockets with chains;

by way of the above structures, the input shaft (2000) is driven at the first rotary direction, and it is through the one-way transmission (301) for driving the driving wheel (605), and through the transmission belt (607) for driving the driving wheel (606), and further driving the output shaft (3000) to produce the first rotary direction output, therefore to constitute the first transmission gear train;

by way of the above structures, the input shaft (2000) is driven at the second rotary direction, and it is through the one-way transmission (305) driving the driving wheel (602), and then through the driving wheel (602) driving the driving wheel (603) for driving the output shaft (3000) to produce the first rotary direction output, therefore to constitute the second transmission gear train;

one or two ends of the output shaft (3000) are arranged for executing output.

Figure 12:
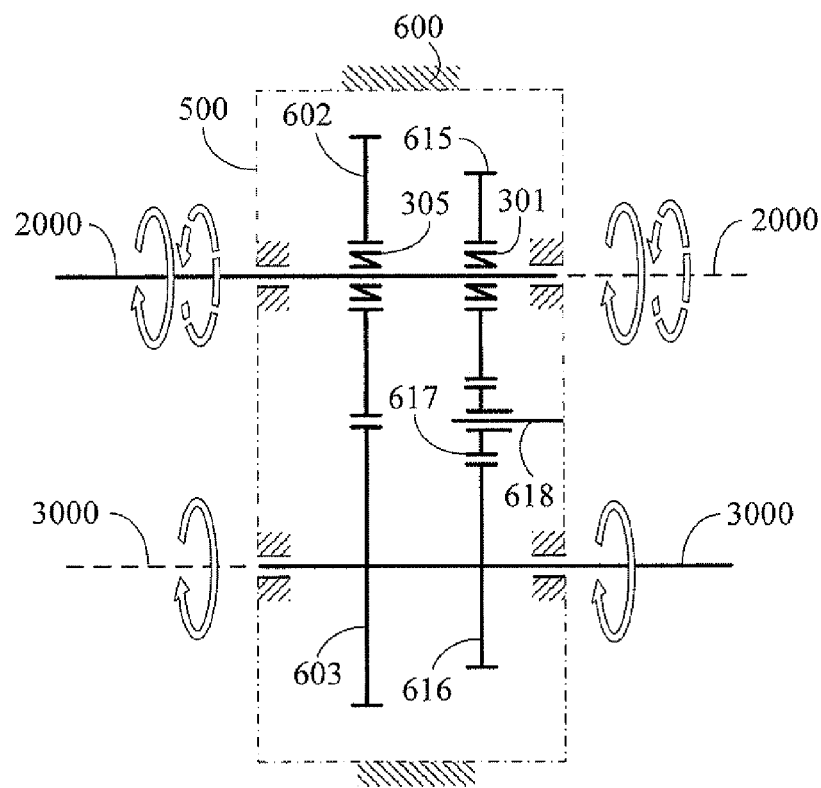
FIG. 12 is a schematic structural view showing the 8th embodiment of the drive device with bidirectional input and one-way output (13).

FIG. 12 is a schematic structural view showing the 8th embodiment of the drive device with bidirectional input and one-way output (13).

As shown in FIG. 12, the bicycle with bidirectional input and one-way output of the present invention is constituted by integrating with the transmissions with different drive rotating directions, in which the input shaft and the output shaft have different axes, the main components including:

one end of the input shaft (2000) is through installed at one side of the shell of the transmission gear train (500) via a bearing structure, while the other end of the input shaft (2000) perforates through the driving wheel (615) via the one-way transmission (301), a bearing is installed between the other end of the input shaft (2000) and the shell of the transmission gear train (500), and the rotary power source is inputted through one or two ends of the input shaft (2000);

shell of the transmission gear train (500): machine parts installed for constituting the wheel system with bidirectional input and one-way output;

machine body (600): a relatively static mechanism structure;

the input shaft (2000) is perforating through the one-way transmission (305), and then integrated with the driving wheel (602);

the driving wheel (615) drives the driving wheel (616) via the driving wheel (617), the driving wheel (616) is integrated with the output shaft (3000), and a bearing is installed between the output shaft (3000) and the shell of the transmission gear train (500);

the driving wheel (617) rotates at the revolving shaft (618), and the revolving shaft (618) is installed at the shell of the transmission gear train (500);

the driving wheel (602) and the driving wheel (603) are in different rotary directions;

the driving wheel (603) is integrated with the output shaft (3000);

the shell of the transmission gear train (500) is fixed installed at the machine body (600);

the driving wheels (602), (603), (615), (616), and (617) are constituted by gears or friction wheels;

the relation of the transmission ratio in the driving wheel set with different rotary directions includes acceleration, deceleration, or constant velocity;

the relation of the transmission ratio in the driving wheel set with the same rotary direction includes acceleration, deceleration, or constant velocity;

the driving wheel set with the same rotary direction is constituted by the gear set including an idler wheel or by the internal gear set;

by way of the above structures, the input shaft (2000) is driven at the first rotary direction, and it is through the one-way transmission (301) for driving the driving wheel (615), and through the transmission belt (617) for driving the driving wheel (616) for further driving the output shaft (3000) to produce the first rotary direction output, therefore to constitute the first transmission gear train;

by way of the above structures, the input shaft (2000) is driven at the second rotary direction, and it is through the one-way transmission (305) driving the driving wheel (602), and through the driving wheel (602) driving the driving wheel (603), and then through the driving wheel (603) driving the output shaft (3000) to produce the first rotary direction output, therefore to constitute the second transmission gear train;

one or two ends of the output shaft (3000) are arranged for executing output.

The invention claimed is:

1. A bicycle having a bidirectional input and a one-way output, comprising:

a load wheel set driven to cause motion of the bicycle;

an input device for receiving a dual rotary direction input including a first driving rotary direction and a second driving rotary direction which is opposite to the first driving rotary direction, an output terminal of the input device for transmitting a kinetic energy derived from rotation of the input device, wherein the input device includes a pedal, a crank, and a driving wheel set, or a handle, a hand shank, and a driving wheel set;

a drive device for receiving a bidirectional input and producing a one-way output, an input terminal of the drive device for receiving the kinetic energy from the output terminal of the input device, an output terminal of the drive device producing a constant rotary direction output for driving the load wheel set; and a pre-transmission device installed between the input device and the drive device and including rotary transmission structures constituted by at least one of a gear type, a belt type or a friction-type, wherein the pre-transmission device transmits the kinetic energy to the drive device, wherein the drive device includes transmission components constituted by at least one of a gear set, a friction wheel set, a chain and sprocket section, a belt and pulley section, a transmission crank and wheel set, a fluid transmission unit, and an electromagnetic force actuator, wherein when the input device receives the first driving rotary direction, a first transmission gear train drives the output terminal of the drive device for producing the constant rotary direction output, and when the input device receives the second driving rotary direction, a second transmission gear train drive the output terminal of the drive device for producing the constant rotary direction output, wherein a first one-way transmission is installed between the first transmission gear train and the second transmission gear train for preventing interference from the second transmission gear train when the first transmission gear train drives the output terminal of the drive device, and a second one-way transmission is installed between the second transmission gear train and the first transmission gear train for preventing interference from the first transmission gear train when the second transmission gear train drives the output terminal of the drive device.

2. The bicycle as claimed in claim 1, further comprising: a rear transmission installed between the drive device and the load wheel set and including rotary transmission structures constituted by at least one of a gear type, a belt type or a friction-type.

3. The bicycle as claimed in claim 1, wherein the drive device includes a shell having a planetary gear train with an input shaft and an output shaft coaxial with the input shaft, a first end of the input shaft extending from a first side of the shell via a bearing and a second end of the input shaft extending through the output shaft via at least one of the first one-way transmission and the second one-way transmission, and a bearing installed between the output shaft and the shell,
wherein the input shaft is integrated with a sun gear, a planetary wheel engages the sun wheel and is installed between the sun wheel and an outer wheel, a center of the planetary wheel rotates at the planetary wheel shaft and a first end of the planetary wheel shaft is fixed at the shell of the drive device, the shell is fixedly installed at a machine body, and the first one-way transmission is installed between a ring structure of the outer wheel and the output shaft,
wherein when the input shaft is driven in the first driving rotary direction, the second one-way transmission produces the constant rotary direction output through the output shaft via the first transmission gear train, and when the input shaft is driven in the second driving rotary direction, the first one-way transmission produces the constant rotary direction output through the output shaft via the second transmission gear train.

4. The bicycle as claimed in claim 1, wherein the drive device includes a shell having a planetary gear train with an input shaft and an output shaft coaxial with the input shaft, a first end of the input shaft extending from a first side of the shell between a rotational structure of a planetary wheel support arm annular shelf and a third one-way transmission and a second end of the input shaft extending through the output shaft via at least one of the first one-way transmission and the second one-way transmission, and a bearing installed between the output shaft and the shell,
wherein the input shaft is integrated with a sun gear, a planetary wheel engages the sun wheel and is installed between the sun wheel and an outer wheel, a center of the planetary wheel rotates at the planetary wheel shaft and a first end of the planetary wheel shaft is integrated with the planetary wheel support arm annular shelf and the planetary wheel support arm annular shelf rotates between the input shaft and the third one-way transmission, the shell is fixedly installed at a machine body, and the first one-way transmission is installed between a ring structure of the outer wheel and the output shaft,
wherein when the input shaft is driven in the first driving rotary direction, the second one-way transmission produces the constant rotary direction output through the output shaft via the first transmission gear train, and when the input shaft is driven in the second driving rotary direction, the first one-way transmission produces the constant rotary direction output through the output shaft via the second transmission gear train.

5. The bicycle as claimed in claim 1, wherein the drive device includes a shell having an epicyclic gear train with an input shaft and an output shaft coaxial with the input shaft, a first end of the input shaft extending from a first side of the shell via a bearing and a second end of the input shaft extending through the output shaft via at least one of the first one-way transmission and the second one-way transmission, and a bearing installed between the output shaft and the shell,
wherein the input shaft is integrated with an inner bevel wheel, an epicyclic gear is installed between an outer bevel wheel and the inner bevel wheel, a center of the epicyclic gear rotates at an epicyclic gear shaft, a first end of the epicyclic gear shaft is integrated with the epicyclic gear support arm annular shelf, the epicyclic gear support arm annular shelf is fixed at the shell, the shell is fixedly installed at a machine body, and the first one-way transmission is installed between the outer bevel wheel and the output shaft,
wherein when the input shaft is driven in the first driving rotary direction, the second one-way transmission produces the constant rotary direction output through the output shaft via the first transmission gear train, and when the input shaft is driven in the second driving rotary direction, the inner bevel wheel drives the epicyclic gear and the outer bevel wheel which further drives the first one-way transmission for producing the constant rotary direction output through the output shaft via the second transmission gear train.

6. The bicycle as claimed in claim 1, wherein the drive device includes a shell having an epicyclic gear train with an input shaft and an output shaft coaxial with the input shaft, a first end of the input shaft being installed at an epicyclic gear support arm annular shelf via a bearing, the epicyclic gear support arm annular shelf being integrated with a first side of the shell via a third one-way transmission, a second end of the input shaft extending through the output shaft via at least one of the first one-way transmission and the second one-way transmission, and a bearing installed between the output shaft and the shell,
wherein the input shaft is integrated with an inner bevel wheel, an epicyclic gear is installed between an outer bevel wheel and the inner bevel wheel, a center of the epicyclic gear rotates at an epicyclic gear shaft, a first end of the epicyclic gear shaft is integrated with the epicyclic gear support arm annular shelf, the epicyclic gear support arm annular shelf rotating between the input shaft and the third one-way transmission, the shell is fixedly installed at a machine body, and the outer bevel wheel is connected to the output shaft via the first one-way transmission,
wherein when the input shaft is driven in the first driving rotary direction, the second one-way transmission produces the constant rotary direction output through the output shaft via the first transmission gear train, and when the input shaft is driven in the second driving rotary direction, the inner bevel wheel drives the epicyclic gear and the outer bevel wheel which further drives the first one-way transmission for producing the constant rotary direction output through the output shaft via the second transmission gear train.

7. The bicycle as claimed in claim 1, wherein the drive device includes a shell having an input shaft and an output shaft coaxial with the input shaft, a first end of the input shaft extending from a first side of the shell via a bearing and a second end of the input shaft extending through the output shaft via at least one of the first one-way transmission and the second one-way transmission, and a bearing installed between the output shaft and the shell,
  wherein the input shaft extends through a fourth one-way transmission and is integrated with a first driving wheel, the first driving wheel rotates in a different direction than a second driving wheel, a third driving wheel is integrated with the output shaft, the second driving wheel and a fourth driving wheel are co-integrated with a first revolving shaft, a bearing is installed between the first revolving shaft and the shell, and the third driving wheel and the fourth driving wheel engage a transmission belt to form a first driving wheel set,
  wherein when the input shaft is driven in the first driving rotary direction, the second one-way transmission produces the constant rotary direction output through the output shaft via the first transmission gear train, and when the input shaft is driven in the second driving rotary direction, the fourth one-way transmission drives the first driving wheel which drives the second driving wheel which drives the fourth driving wheel which drives the third driving wheel for producing the constant rotary direction output through the output shaft via the second transmission gear train.

8. The bicycle as claimed in claim 1, wherein the drive device includes a shell having an input shaft and an output shaft coaxial with the input shaft, a first end of the input shaft extending from a first side of the shell via a bearing and a second end of the input shaft extending through the output shaft via at least one of the first one-way transmission and the second one-way transmission, and a bearing installed between the output shaft and the shell,
  wherein the input shaft extends through a fourth one-way transmission and is integrated with a first driving wheel, the first driving wheel rotates in a different direction than a second driving wheel, a fifth driving wheel is integrated with the output shaft, the second driving wheel and a sixth driving wheel are co-integrated with a first revolving shaft, a bearing is installed between the first revolving shaft and the shell, and the sixth driving wheel engages a seventh driving wheel which rotates a second revolving shaft which drives the fifth driving wheel to form a first driving wheel set, and the second revolving shaft being integrated with the shell,
  wherein when the input shaft is driven in the first driving rotary direction, the second one-way transmission produces the constant rotary direction output through the output shaft via the first transmission gear train, and when the input shaft is driven in the second driving rotary direction, the fourth one-way transmission drives the first driving wheel which drives the second driving wheel which drives the sixth driving wheel which drives the fifth driving wheel via the seventh driving wheel for producing the constant rotary direction output through the output shaft via the second transmission gear train.

9. The bicycle as claimed in claim 1, wherein the drive device includes a shell having an input shaft and an output shaft, a first end of the input shaft extending from a first side of the shell via a first bearing and a second end of the input shaft extending through a third driving wheel via a first one-way transmission, the input shaft and the output shaft having different axes, and a bearing installed between the second end of the input shaft and the shell, and the input shaft receiving a rotary power source at least one of the first end of the input shaft and the second end of the input shaft,
  wherein the input shaft extends through a fourth one-way transmission and is integrated with a first driving wheel, the first driving wheel rotates in a different direction than a second driving wheel, the second driving wheel and a fourth driving wheel are integrated with the output shaft, a second bearing is installed between the output shaft and the shell, and a third driving wheel and the fourth driving wheel engage a transmission belt to form a first driving wheel set,
  wherein when the input shaft is driven in the first driving rotary direction, the first one-way transmission produces the constant rotary direction output through the output shaft by driving the third driving wheel which drives a transmission belt which drives the fourth driving wheel via the first transmission gear train, and when the input shaft is driven in the second driving rotary direction, the fourth one-way transmission produces the constant rotary direction output through the output shaft by driving the first driving wheel which drives the second driving wheel via the second transmission gear train.

10. The bicycle as claimed in claim 1, wherein the drive device includes a shell having an input shaft and an output shaft, a first end of the input shaft extending from a first side of the shell via a first bearing and a second end of the input shaft extending through a fifth driving wheel via a first one-way transmission, the input shaft and the output shaft having different axes, and a bearing installed between the second end of the input shaft and the shell, and the input shaft receiving a rotary power source at least one of the first end of the input shaft and the second end of the input shaft,
  wherein the input shaft extends through a fourth one-way transmission and is integrated with a first driving wheel, the first driving wheel rotates in a different direction than a second driving wheel, the second driving wheel and a sixth driving wheel are integrated with the output shaft, a second bearing is installed between the output shaft and the shell, the fifth driving wheel drives the sixth driving wheel via a seventh driving wheel, and a seventh driving wheel rotates a second revolving shaft which is installed on the shell,
  wherein when the input shaft is driven in the first driving rotary direction, the first one-way transmission produces the constant rotary direction output through the output shaft by driving the fifth driving wheel which drives the seventh driving wheel which drives the sixth driving wheel via the first transmission gear train, and when the input shaft is driven in the second driving rotary direction, the fourth one-way transmission produces the constant rotary direction output through the output shaft by driving the first driving wheel which drives the second driving wheel via the second transmission gear train.

* * * * *